United States Patent
Nakatsuka

(10) Patent No.: US 10,359,616 B2
(45) Date of Patent: Jul. 23, 2019

(54) MICROSCOPE SYSTEM. METHOD AND COMPUTER-READABLE STORAGE DEVICE STORING INSTRUCTIONS FOR GENERATING JOINED IMAGES

(71) Applicant: OLYMPUS CORPORATION, Tokyo (JP)

(72) Inventor: Masayuki Nakatsuka, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 93 days.

(21) Appl. No.: 15/334,371

(22) Filed: Oct. 26, 2016

(65) Prior Publication Data
US 2017/0153438 A1    Jun. 1, 2017

(30) Foreign Application Priority Data
Nov. 26, 2015  (JP) .................................. 2015-230789

(51) Int. Cl.
*H04N 7/18*    (2006.01)
*G02B 21/36*   (2006.01)
(Continued)

(52) U.S. Cl.
CPC ........... *G02B 21/365* (2013.01); *G02B 21/26* (2013.01); *G02B 21/367* (2013.01);
(Continued)

(58) Field of Classification Search
CPC .... G02B 21/365; G02B 21/367; G02B 21/26; G02B 21/368; G06T 7/70; H04N 5/265; H04N 5/23222; H04N 5/23293
(Continued)

(56) References Cited

U.S. PATENT DOCUMENTS

2006/0133657 A1  6/2006 Schmid et al.
2009/0196526 A1  8/2009 Schmid et al.
(Continued)

FOREIGN PATENT DOCUMENTS

EP   2 194 414 A2   6/2010
JP   2010-134374 A   6/2010
(Continued)

OTHER PUBLICATIONS

Extended European Search Report dated Mar. 24, 2017 in European Patent Application No. 16 18 8927.4.

*Primary Examiner* — Richard T Torrente
(74) *Attorney, Agent, or Firm* — Scully, Scott, Murphy & Presser, P.C.

(57) ABSTRACT

Provided are a microscope including a stage that is movable in a direction perpendicular to an observation optical axis and a camera capturing an image of a sample mounted on the stage; and a processor including hardware, wherein the processor is configured to implement: a generating unit configured to join the image of the sample to generate a joined image; a determination unit configured to determine whether the position of the stage is a position suitable for image capturing; a notifying unit configured to, when it is determined that the position is suitable, issue a notification to that effect; and a control unit configured to control the generating unit so as to join the image obtained by the camera when the moving speed of the stage is at or below a prescribed threshold, in the state where it is being notified that the position is suitable for image capturing.

12 Claims, 5 Drawing Sheets

(51) Int. Cl.
  *G02B 21/26* (2006.01)
  *H04N 5/232* (2006.01)
  *H04N 5/265* (2006.01)
  *G06T 7/70* (2017.01)
(52) U.S. Cl.
  CPC .............. *G02B 21/368* (2013.01); *G06T 7/70* (2017.01); *H04N 5/23222* (2013.01); *H04N 5/23293* (2013.01); *H04N 5/265* (2013.01)
(58) Field of Classification Search
  USPC .......................................................... 348/80
  See application file for complete search history.

(56) References Cited

U.S. PATENT DOCUMENTS

| | | | | |
|---|---|---|---|---|
| 2010/0066838 | A1* | 3/2010 | Steckhan | G06T 7/80 348/187 |
| 2010/0171809 | A1 | 7/2010 | Fujiyoshi | |
| 2011/0221881 | A1* | 9/2011 | Shirota | G02B 21/26 348/79 |
| 2015/0138502 | A1* | 5/2015 | Moriguchi | A61B 3/14 351/206 |

FOREIGN PATENT DOCUMENTS

| | | |
|---|---|---|
| JP | 2011-186305 A | 9/2011 |
| JP | 2013-072999 A | 4/2013 |
| WO | 2006/023675 A2 | 3/2006 |

\* cited by examiner

MICROSCOPE SYSTEM. METHOD AND COMPUTER-READABLE STORAGE DEVICE STORING INSTRUCTIONS FOR GENERATING JOINED IMAGES

CROSS-REFERENCE TO RELATED APPLICATIONS

This application claims the benefit of Japanese Patent Application No. 2015-230789, the contents of which is incorporated herein by reference.

TECHNICAL FIELD

The present invention relates to a microscope system and a control method therefore.

BACKGROUND ART

In the related art, there is a known microscope system that joins together a plurality of stationary images obtained while moving the viewing field by moving a stage on which a sample is mounted, thus generating a wide-viewing-angle joined image (for example, see Patent Literature 1).

CITATION LIST

Patent Literature

{PTL 1}
Japanese Unexamined Patent Application, Publication No. 2010-134374

SUMMARY OF INVENTION

An aspect of the present invention is a microscope system comprising: a microscope that includes a stage on which a sample is mounted and that is movable in a direction perpendicular to an observation optical axis and a camera that captures an image of the sample on the stage; and a processor comprising hardware, wherein the processor is configured to implement: an image generating unit configured to join the image of the sample obtained by the camera to generate a joined image; a determination unit configured to determine, on the basis of the position of the stage, whether the position is a position that is suitable for image capturing by the camera; a notifying unit configured to, when it is determined as a result of the determination by the determination unit that the position is suitable for image capturing, issue a notification to that effect; and a control unit configured to control the image generating unit so as to join the image obtained by the camera when the moving speed of the stage is at or below a prescribed threshold, in the state where it is being notified by the notifying unit that the position is suitable for image capturing.

Another aspect of the present invention is a microscope system control method comprising: detecting a position and speed of a stage on which a sample is mounted and that is movable in a direction perpendicular to an observation optical axis; capturing an image of the sample on the stage; determining, on the basis of the position of the stage which is detected, whether the position is a position that is suitable for image capturing; when it is determined as a result of the determination that the position is suitable for image capturing, issuing a notification to that effect; and joining the image obtained by the image acquisition at the instant the detected moving speed of the stage is at or below a prescribed threshold, in the state where it is being notified that the position is suitable for image capturing.

BRIEF DESCRIPTION OF DRAWINGS

FIG. 1 is a diagram showing the overall configuration of a microscope system according to an embodiment of the present invention.
FIG. 2 is a flowchart showing a control method of the microscope system according to the embodiment of the present invention.
FIG. 3A is an example of the display on a display unit of the microscope system in FIG. 1 and shows a state in which a frame is formed around a viewing field range in a joined image.
FIG. 3B is an example of the display on a display unit of the microscope system in FIG. 1 and shows a state in which the viewing field range is moved from the position in FIG. 3A.
FIG. 3C is an example of the display on a display unit of the microscope system in FIG. 1 and shows a state in which an overlapping range between the joined image and the viewing field range falls within a prescribed range.
FIG. 3D is an example of the display on a display unit of the microscope system in FIG. 1 and shows a state in which a new joined image, to which the image of the viewing field range in FIG. 3C is to be joined, is formed.
FIG. 4 is a diagram showing the overall configuration of a modification of the microscope system in FIG. 1.
FIG. 5 is a diagram showing the overall configuration of a modification of the microscope system in FIG. 1.

DESCRIPTION OF EMBODIMENT

A microscope system 1 according to an embodiment of the present invention will be described below with reference to the drawings.

Figure 1:
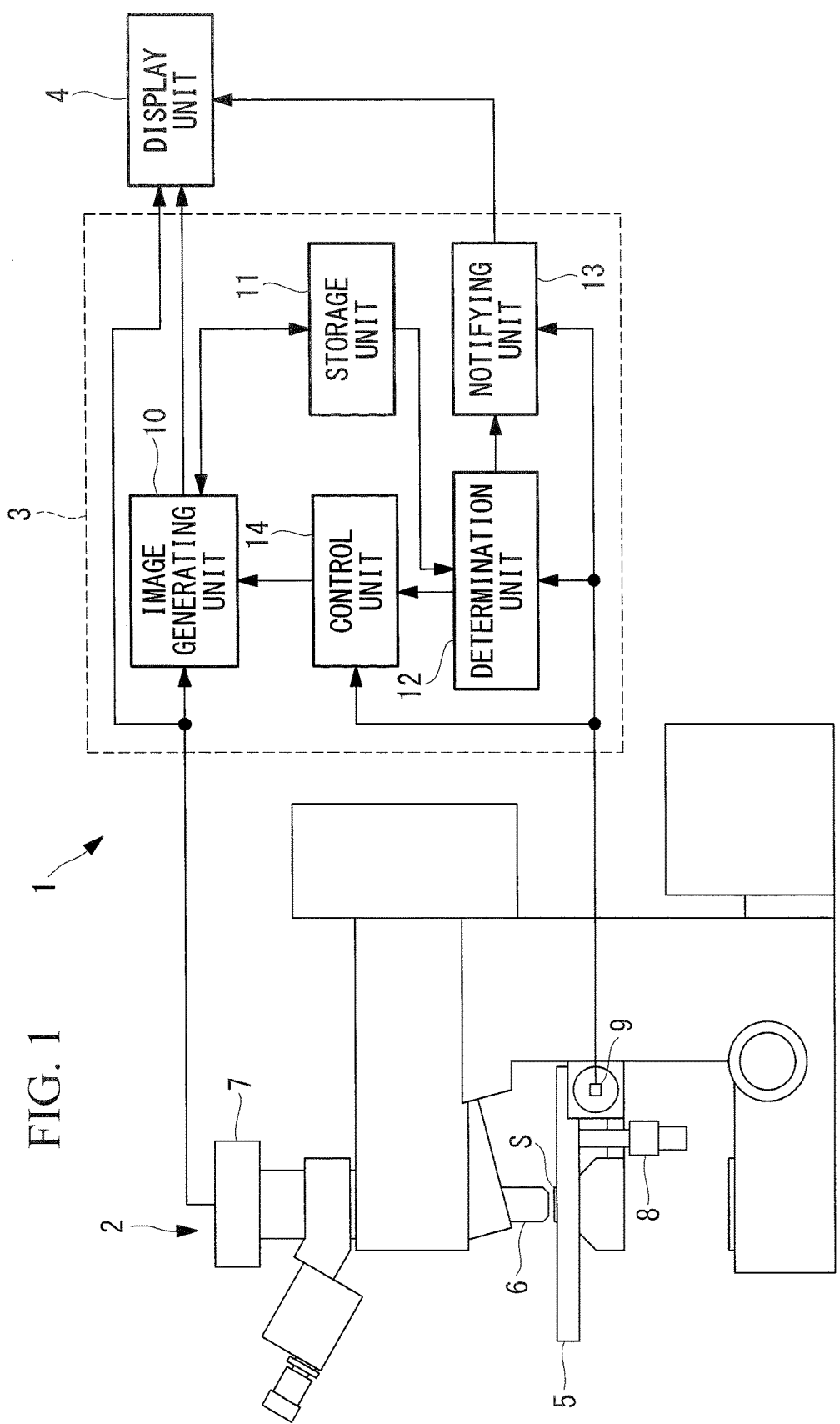
{FIG. 1}

As shown in FIG. 1, the microscope system 1 according to this embodiment includes a microscope body 2, a computing unit 3, and a display unit 4.

The microscope body 2 includes a stage 5 that can move a mounted sample in three-dimensional directions, an objective lens 6 whose observation optical axis is disposed in the vertical direction, and a camera (image acquisition unit) 7 that captures images of light from the sample S, the light being collected by the objective lens 6. The microscope body 2 is also provided with a manipulation unit 8 that a user manually manipulates to move the stage 5 in two directions (horizontal directions) perpendicular to the observation optical axis of the objective lens 6, and an encoder (position detecting unit, speed detecting unit) 9 for detecting the position and speed of the stage 5.

The camera 7 obtains live images from a plurality of images captured at a prescribed frame rate and sends them to the computing unit 3.

The computing unit 3 is, for example, a general-purpose personal computer or workstation, or a computer that uses an embedded processor or FPGA (Field Programmable Gate Array). The computing unit 3 includes an image generating unit 10 that generates a joined image by joining together the images sent from the camera 7, a storage unit 11 that stores the joined image generated by the image generating unit 10, a determination unit 12 that makes a determination on the basis of a signal from the encoder 9, a notifying unit 13 that issues a notification of the determination result, and a control unit 14 that controls the image generating unit 10. The computing unit 3 is configured to output the live images sent thereto from the camera 7 to the display unit 4, as is, and to display them on the display unit 4.

The image generating unit 10, in response to an instruction from the control unit 14, joins an image obtained by the camera 7 and a joined image stored in the storage unit 11 on the basis of position information of the stage 5, obtained by the encoder 9, thus generating a new joined image. The storage unit 11, which is any kind of storage device such as a memory, HDD, SSD or the like, is configured to update the stored joined image when a new joined image is sent thereto from the image generating unit 10.

The determination unit 12 is configured to determine whether or not the position of the stage 5 is a position suitable for capturing an image for which joining is to be newly performed, on the basis of the position information of the stage 5 sent thereto from the encoder 9 and the joined image stored in the storage unit 11. The determination as to whether the position is a position suitable for capturing an image for which joining is to be newly performed is made by determining whether or not the ratio of the area of an overlapping portion of the joined image stored in the storage unit 11 and the image to be newly joined with respect to the viewing angle of the camera 7 falls within a prescribed range (for example, 20%).

If the ratio of the area of the overlapping portion falls within the prescribed range, the determination unit 12 determines that the position is suitable for image capturing.

Here, the determination unit 12 may determine whether or not the position of the stage 5 is a position suitable for capturing an image for newly performing joining, on the basis of the position information of the stage 5 sent thereto from the encoder 9.

Specifically, the determination unit 12 calculates the distance between the position of the stage 5 at which the previous image capturing was performed (at which the previous joining was performed) and the current position of the stage 5, and if this distance falls within a prescribed range of values, determines that the position is suitable for image capturing (suitable for joining).

The notifying unit 13 creates a frame (for example, in red) F that shows the field of view of the camera 7 corresponding to the position of the stage 5, on the basis of the position information of the stage 5 sent from the encoder 9, and outputs it to the display unit 4. In addition, the notifying unit 13 changes the color of the frame F output to the display unit 4 to, for example, blue, when a determination result that the position is suitable for image capturing is sent from the determination unit 12. The user viewing the display unit 4 can thus know that a position suitable for image capturing has been reached, by seeing that the displayed color of the frame F has changed to blue.

The control unit 14 sets the image to be newly joined on the basis of the determination result sent thereto from the determination unit 12 and moving speed information of the stage 5, sent from the encoder 9, and controls the image generating unit 10 so as to generate the joined image.

Specifically, if the determination result sent from the determination unit 12 is a determination result that the position is suitable for image capturing, and if the moving speed of the stage 5, sent from the encoder 9, is a prescribed threshold or lower, the control unit 14 issues an image-generating instruction to the image generating unit 10. Then, the image generating unit 10 sets the image obtained by the camera 7 at the instant the image-generating instruction is input from the control unit 14 as the image to be newly joined, and generates the joined image.

The display unit 4, which is, for example, a liquid crystal display, displays the joined image and a live image and also displays a frame F indicating the present field of view, sent thereto from the notifying unit 13.

A control method for the microscope system 1 according to this embodiment, configured in this way, will be described below.

In the microscope body 2, capturing of live images is continuously performed by the camera 7 at a prescribed frame rate, and will be explained with the assumption that the live images are displayed on the display unit 4.

Figure 2:
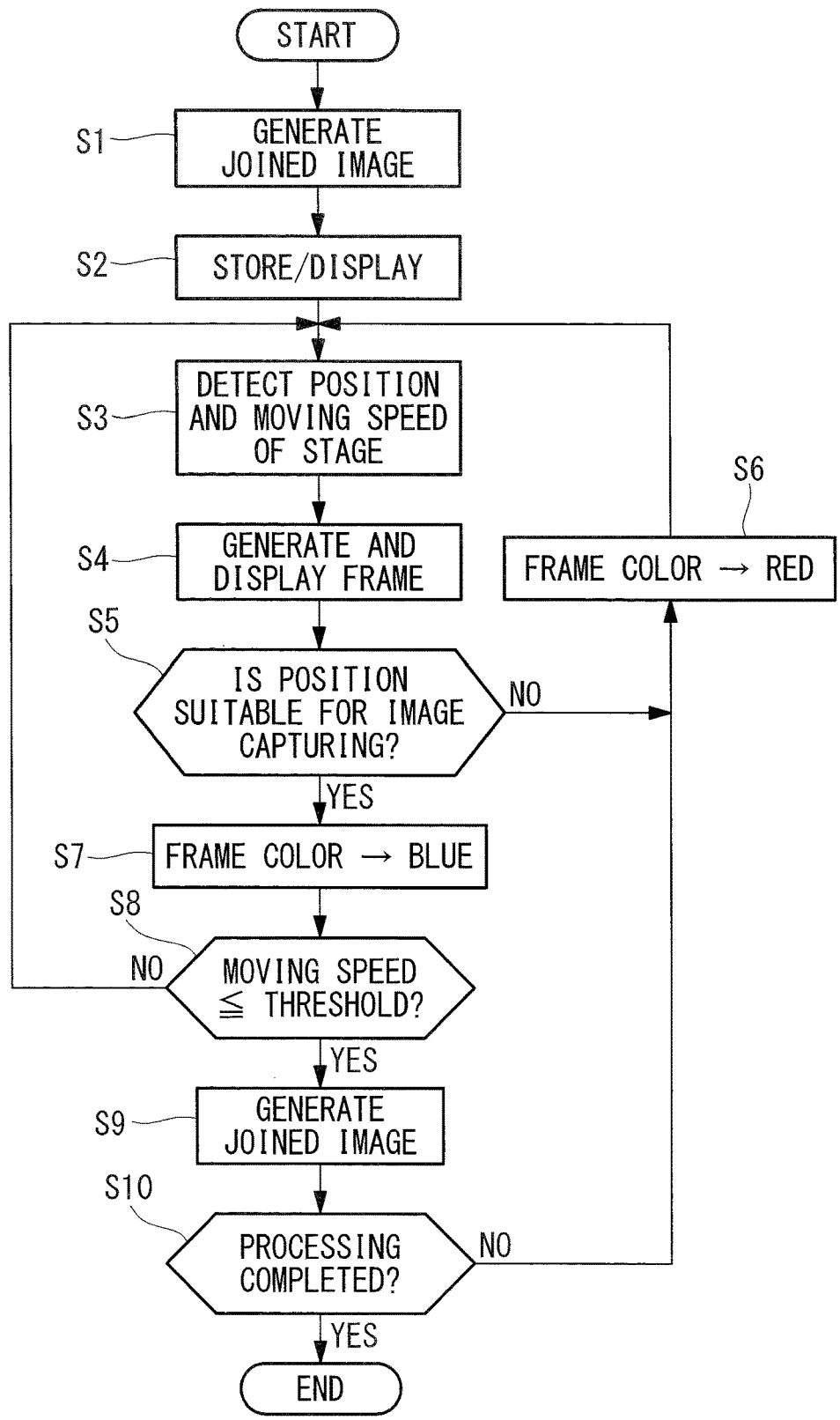
{FIG. 2}
Figure 3A:
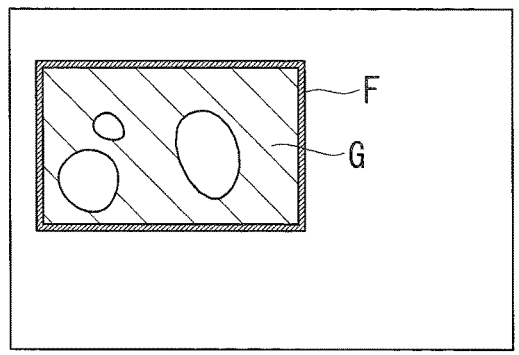
{FIG. 3A}

To generate a joined image using the microscope system 1 according to this embodiment, as shown in FIG. 2, after the joining processing is started, an image of the sample S initially sent from the camera 7 is sent to the image generating unit 10, and an initial joined image G is generated (step S1) and is stored in the storage unit 11, and is also displayed on the display unit 4, as shown in FIG. 3A (step S2).

Then, when the manipulation unit 8 is operated by the user to move the stage 5 in the horizontal direction, the position and moving speed of the stage 5 are detected by the encoder 9 (step S3). Then, as shown in FIG. 3A, the frame F indicating the field of view corresponding to the position of the stage 5 detected by the encoder 9 is generated by the notifying unit 13 and is displayed on the display unit 4 so as to be superimposed on the joined image G (step S4).

Next, on the basis of the position of the stage 5 detected by the encoder 9 and the joined image G stored in the storage unit 11, it is determined by the determination unit 12 whether or not the position is suitable for capturing an image for which joining is to be newly performed (step S5).

Figure 3B:
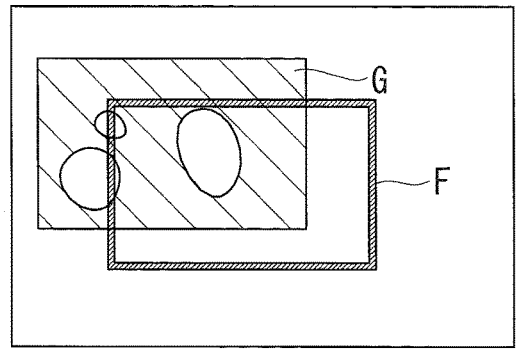
{FIG. 3B}

When the stage 5 begins to move, as shown in FIG. 3A and FIG. 3B, the joined image G and the frame F indicating the field of view overlap by a large amount, and the determination unit 12 determines that the position is not suitable for image capturing; therefore, the frame F generated by the notifying unit 13 is set to red (step S6), and the processing from step S3 is repeated. Because the frame F displayed on the display unit 4 is red, the user knows that the position is not suitable for image capturing and continues to manipulate the stage 5.

Figure 3C:
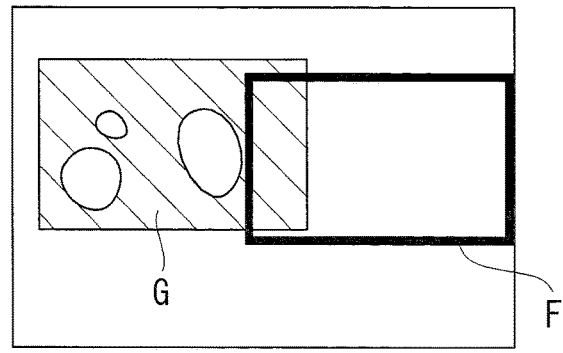
{FIG. 3C}

The user continues to manipulate the stage 5, whereby the position of the frame F displayed on the display unit 4 is updated, and when the overlapping region of the joined image G and the frame F indicating the field of view falls within a prescribed range, as shown in FIG. 3C, the determination unit 12 determines that the position is suitable for capturing an image for which joining is to be newly performed. Accordingly, the notifying unit 13 sets the frame F to blue (step S7).

When the frame F displayed on the display unit 4 is set to blue, the user knows that the position is suitable for image capturing and manipulates the manipulation unit 8 so as to stop the stage 5.

As a result, in the control unit 14, it is determined whether or not the moving speed of the stage 5 detected by the encoder 9 is a prescribed threshold or lower (step S8), and if it is equal to or lower than the prescribed threshold, an instruction for performing joining is issued to the image generating unit 10, and a joined image G is generated (step S9). If the moving speed is greater than the prescribed threshold, the processing from step S3 is repeated.

When the joining instruction is input from the control unit 14, the image generating unit 10 sets the image sent from the camera 7 at that instant (for example, the time point shown in FIG. 30) as the image for which joining is to be newly performed. Then, the image generating unit 10 performs joining processing with that image overlapping the joined image G read out from the storage unit 11, and then stores the joined image generated as shown in FIG. 3D in the storage unit 11 and displays it on the display unit 4.

Then, it is determined whether the joined image generating processing has been completed (step S10), and if it has not been completed, the processing from step S6 is repeated.

Figure 3D:
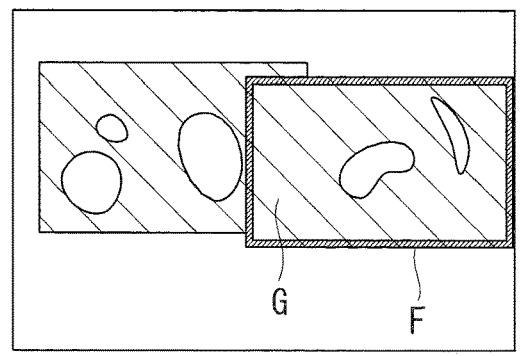
{FIG. 3D}

In other words, at the point in time when the new joined image G is generated, the overlapping range of the frame F indicating the field of view of the camera 7 and the joined image G is large; and therefore, as shown in FIG. 3D, the notifying unit 13 reverts the color of the frame F displayed on the display unit 4 to red, whereby the user is prompted to move the stage 5 to the next image-capturing position.

Although it has been assumed that the determination as to whether the joining processing has been completed is performed after step S10 for generating the joined image, it can be completed at an arbitrary timing at which the user desires to complete the joining processing.

With the microscope system 1 according to this embodiment, configured in this way, and the control method therefore, it is possible to generate a joined image G just by repeating the moving and stopping operations of the stage 5 while the user looks at the joined image G and the frame F displayed on the display unit 4.

In other words, it is possible to generate a joined image simply by the user moving the stage 5 when the frame F displayed on the display unit 4 is red, and stopping the stage 5 when the frame F becomes blue, and since the frame F returns to red at that time point, it is possible to quickly resume the operation for moving the stage 5 to the next image acquisition position.

Since the operation of the stage 5 is simple, namely, only the moving operation and the stopping operation, and an image-capturing operation and a positioning operation are not necessary, advantages are afforded in that the burden on the user in terms of the operation that he/she performs can be reduced, and the time required for generating a joined image can be considerably shortened.

In addition, with the microscope system 1 according to this embodiment and the control method therefore, because only an image captured when the moving speed of the stage 5 is at or below the prescribed threshold is used to generate the joined image G, an advantage is afforded in that it is possible to obtain a high-quality joined image G in which the level of exposure-light blurring caused by exposure-light in the camera 7 is small.

Figure 4:
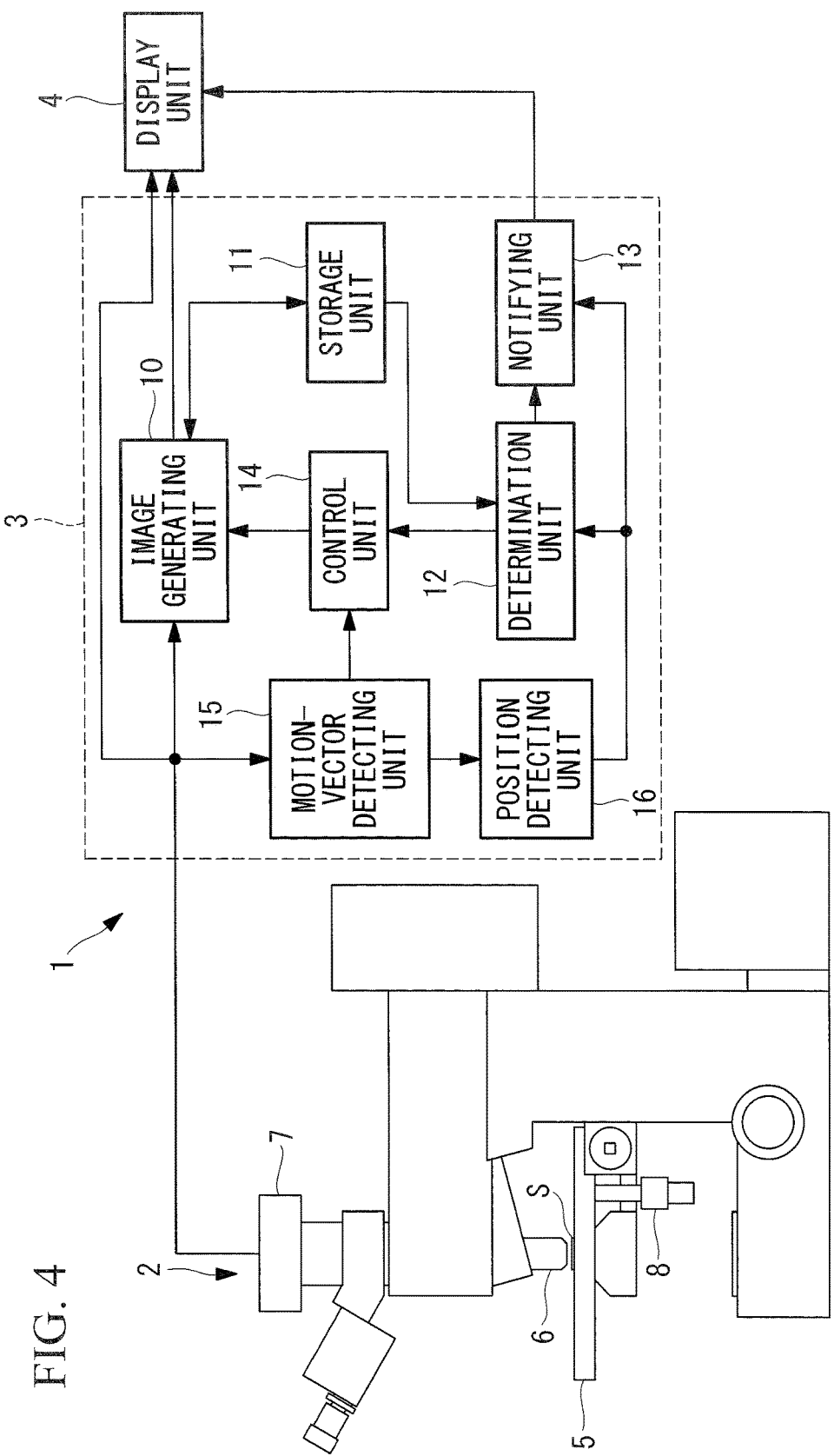
{FIG. 4}

In this embodiment, it has been assumed that the position and the moving speed of the stage 5 are detected by the encoder 9 provided in the microscope body 2; instead of this, however, as shown in FIG. 4, the image obtained by the camera 7 may be processed to obtain the position and moving speed of the stage 5.

In other words, as shown in FIG. 4, the computing unit 3 may include a motion-vector detecting unit (speed detecting unit) that detects a motion vector from the obtained image, and a position detecting unit 16 that detects the position of the stage 5 by cumulatively adding the motion vectors detected by the motion-vector detecting unit 15.

To detect the motion vector, it is possible to use a known technique such as template matching or phase only correlation based on correlation of spatial frequencies, typified by SAD (Sum of Absolute Differences) or NCC (Normalized Cross-Correlation). The motion vector detected by the motion-vector detecting unit 15 shows the moving direction and moving distance between consecutive images obtained at a prescribed frame rate, and therefore, it is possible to calculate the moving speed by dividing the moving distance by the frame rate.

By doing so, even in the microscope body 2 having a manually movable stage that does not include the encoder 9, it is possible to obtain the same result as in this embodiment without adding a detector such as the encoder 9.

In addition, in the case where the moving speed of the stage 5 and the position of the stage 5 are detected from the images, other than cases where only the images obtained by the camera are used, they may be detected using the joined image stored in the storage unit 11 and the image obtained by the camera 7.

Figure 5:
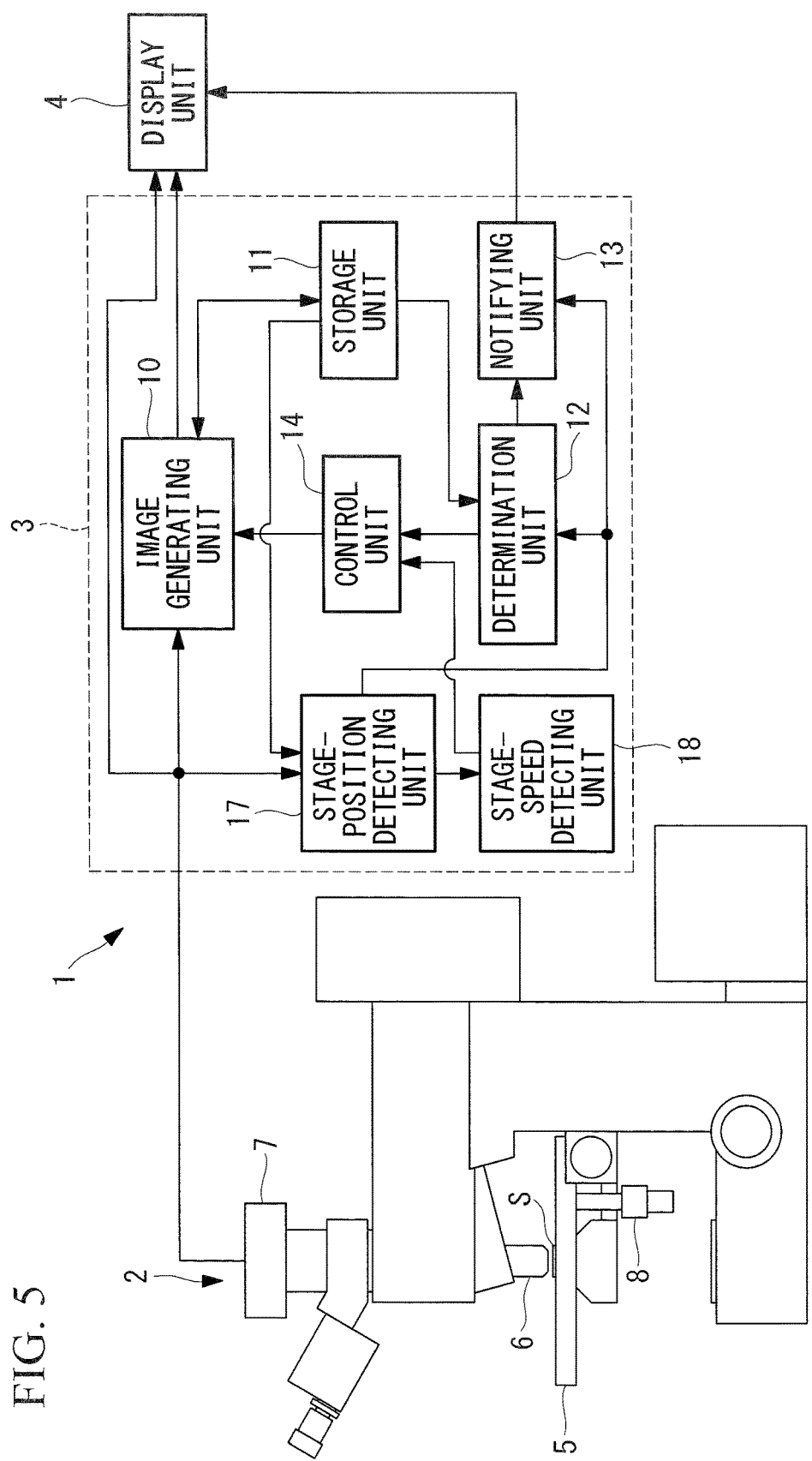
{FIG. 5}

Specifically, as shown in FIG. 5, the computing unit 3 includes a stage-position detecting unit (position detecting unit) 17 and a stage-speed detecting unit (speed detecting unit) 18. The stage position detecting unit 17 detects the relative position of each image on the joined image by performing template matching on the joined image, with part of the image obtained by the camera 7 serving as a template. To detect the relative position, it is possible to use the methods mentioned above. Accordingly, the position of the stage 5 can be detected.

On the other hand, it suffices that the stage speed detecting unit 18 detects the moving speed of the stage 5 by calculating the time differential, specifically, the inter-frame difference, of the position of the stage 5 in each frame, detected by the stage position detecting unit.

There is an error in detecting the position and moving speed of the stage 5 with the encoder 9 provided in the microscope body 2. In particular, in the case where a high-magnification objective lens 6 is selected in the microscope body 2, the error is large in the image obtained by the camera 7. When the joining processing is performed in the state where the position of the stage 5 contains an error, a discontinuous boundary occurs in the joined image.

In addition, there are cases where an error is included in the detection result due to motion blur or subpixel movement during exposure, and so forth, even in cases where the position of the stage 5 is detected by cumulatively adding motion vectors. Therefore, when the position of the stage 5 is calculated by cumulatively adding motion vectors, the errors therein are cumulatively added, thus causing an error in the actual physical position of the stage 5, and a discontinuous boundary occurs in the joined image.

To overcome these drawbacks, rather than directly using the position information of the stage 5 output from the stage position detecting unit 17, it is preferable to perform positioning between the joined image stored in the storage unit 11 and the frame image on which joining is to be performed and then to perform the joining processing. By doing so, even if there is an error in the position of the stage 5 detected by the stage position detecting unit 17, advantages are afforded in that it is possible to reduce the occurrence of boundaries due to positional shifting at the time of joining, and it is possible to create a high-quality joined image.

In addition, in this embodiment, although the notifying unit 13 generates the frame F displayed on the display unit 4 and changes its color from red to blue, thereby notifying the user that the stage 5 has moved to a position suitable for image capturing, as the color of the frame F, it is possible to use any colors, so long as color changes are understood.

Instead of notifying the user by means of the color of the frame F, the user may be notified that the stage 5 has moved to a position suitable for image capturing by means of any method, such as the shape of the frame F, text, audio, and coloring or flashing of the image.

From the above-described embodiment, the following inventions are derived.

An aspect of the present invention is a microscope system comprising: a stage on which a sample is mounted and that is movable in a direction perpendicular to an observation optical axis; a position detecting unit that detects a position of the stage; a speed detecting unit that detects a moving speed of the stage; an image acquisition unit that captures an image of the sample on the stage; an image generating unit that joins the image of the sample obtained by the image acquisition unit to generate a joined image; a determination unit that determines, on the basis of the position of the stage detected by the position detecting unit, whether the position is a position that is suitable for image capturing by the image acquisition unit; a notifying unit that, when it is determined as a result of the determination by the determination unit that the position is suitable for image capturing, issues a notification to that effect; and a control unit that controls the image generating unit so as to join the image obtained by the image acquisition unit when the moving speed of the stage detected by the speed detecting unit is at or below a prescribed threshold, in the state where it is being notified by the notifying unit that the position is suitable for image capturing.

With this aspect, it is possible to obtain a joined image covering a wide area of the sample by mounting the sample on the stage, performing image capturing while positioning the sample on the observation optical axis and moving the stage, and joining the obtained images. In this case, when the stage is moved, the position of the stage is detected by the position detecting unit, and the moving speed of the stage is detected by the speed detecting unit.

On the basis of the position of the stage, the determination unit determines whether or not the current position of the stage is suitable for image capturing, and if the position is suitable for image capturing, a notification to this effect is issued by the notifying unit. Then, in the state in which it is being notified by the notifying unit that the position is suitable for image capturing, if the moving speed of the stage detected by the speed detecting unit is at or below a prescribed threshold, the image generating unit is controlled by the control unit so that the image obtained by the image acquisition unit at that position is joined. Accordingly, the user does not need to repeatedly perform an operation for giving an image-capturing instruction and manipulation of the stage, and therefore, the user operations can be simplified, and the time required for obtaining a joined image can be shortened.

The above-described aspect may further comprise a display unit that displays the joined image and a field of view of the image acquisition unit, wherein the notifying unit may issue a notification, on the display unit, to the effect that the position is suitable for image capturing.

By doing so, simply by the user manipulating the stage while looking at the display unit, and relaxing his/her hand for manipulating the stage when it is being notified on the display unit by the notifying unit that the position is suitable for image capturing, the image captured by the image acquisition unit at that time point is joined to serve as part of the joined image.

In the above-described aspect, the image acquisition unit may obtain a plurality of images at a prescribed frame rate; and the position detecting unit may detect the position of the stage from a cumulative value obtained by cumulatively adding the relative positions between images consecutively obtained by the image acquisition unit.

By doing so, the relative position between the images consecutively obtained at the prescribed frame rate by the image acquisition unit is calculated, and the cumulatively added value obtained by cumulatively adding that relative position is detected as the position of the stage. The position of the stage can be detected without providing a special position sensor.

In the above-described aspect, the image acquisition unit may obtain a plurality of images at a prescribed frame rate; and the speed detecting unit may detect the moving speed of the stage on the basis of the relative position between images consecutively obtained by the image acquisition unit.

By doing so, it is possible to detect the moving speed of the stage in a simple manner by dividing the relative position between consecutively obtained images by the frame rate. Thus, it is possible to detect the moving speed of the stage without providing a special speed sensor.

In the above-described aspect, the image acquisition unit may obtain a plurality of images at a prescribed frame rate; and the position detecting unit may detect, as the position of the stage, the relative position between the joined image generated by the image generating unit and the image obtained by the image acquisition unit.

By doing so, it is possible to directly determine whether the stage is located at a position suitable for newly joining the image to the already obtained joined image.

In the above-described aspect, the speed detecting unit may detect, as the moving speed of the stage, a temporal change in position of the stage detected by the position detecting unit.

By doing so, it is possible to detect the moving speed from the position of the stage in a simple manner without providing a special sensor.

In the above-described aspect, prior to joining the image obtained by the image acquisition unit to the joined image, the image generating unit may perform positioning of the image obtained by the image acquisition unit and the joined image.

By doing so, the occurrence of error from the actual position of the stage due to accumulated errors can be suppressed, and it is possible to prevent the occurrence of a discontinuous boundary in the joined image.

Another aspect of the present invention is a microscope system control method comprising: detecting a position and speed of a stage on which a sample is mounted and that is movable in a direction perpendicular to an observation optical axis; capturing an image of the sample on the stage; determining, on the basis of the position of the stage which is detected, whether the position is a position that is suitable for image capturing; when it is determined as a result of the determination that the position is suitable for image capturing, issuing a notification to that effect; and joining the image obtained by the image acquisition at the instant the detected moving speed of the stage is at or below a prescribed threshold, in the state where it is being notified that the position is suitable for image capturing.

REFERENCE SIGNS LIST 1 microscope system
4 display unit 5 stage
7 camera (image acquisition unit)
9 encoder (position detecting unit, speed detecting unit)
10 image generating unit
12 determination unit
13 notifying unit
14 control unit
15 motion-vector detecting unit (speed detecting unit)
16 position detecting unit
17 stage-position detecting unit (position detecting unit)
18 stage-speed detecting unit (speed detecting unit)
S sample

The invention claimed is:

1. A microscope system comprising:
a microscope comprising:
   a stage on which a sample is mounted;
   a camera configured to be controlled to capture a plurality of live images of the sample mounted on the stage at a prescribed frame rate; and
   an actuator configured to be controlled by a user to move the stage relative to the camera; and
a processor comprising hardware, wherein the processor is configured to:
   generate a first joined image of the sample based on a first live image captured by the camera;
   calculate relative positions between the live images consecutively captured by the camera at the prescribed frame rate;
   cumulatively add the relative positions to obtain a cumulative value;
   detect a position of the stage relative to the camera from the cumulative value;
   as the user controls the actuator to move the stage relative to the camera, determine, on the basis of the position of the stage relative to the camera, whether the position of the stage relative to the camera is within a predetermined range;
   while the position of the stage relative to the camera is determined to be within the predetermined range:
      control an output device to perform a first notification; and
      determine whether a moving speed of the stage relative to the camera is at or below a prescribed threshold; and
   in response to determining that the moving speed of the stage relative to the camera is at or below the prescribed threshold, join at least the first joined image and a second live image captured by the camera to generate a second joined image.

2. The microscope system according to claim 1,
wherein the output device comprises a display, and
wherein the processor is configured to:
   control the display to display the first joined image and a field of view of the camera; and
   while the position of the stage relative to the camera is determined to be within the predetermined range, control the display to display the first notification.

3. The microscope system according to claim 1,
wherein the processor is configured to detect the moving speed of the stage relative to the camera on the basis of the relative positions between the live images consecutively captured by the camera.

4. The microscope system according to claim 1,
wherein the processor is configured to detect, as the position of the stage relative to the camera, the relative position between the first joined image and the second live image captured by the camera.

5. The microscope system according to claim 1,
wherein the processor is configured to detect, as the moving speed of the stage relative to the camera, a temporal change in the position of the stage relative to the camera detected.

6. The microscope system according to claim 1,
wherein the processor is configured to perform positioning of the first joined image and the second live image prior to joining the first joined image and the second live image to generate the second joined image.

7. The microscope system according to claim 1,
wherein the microscope comprises:
   optical elements, wherein the stage is configured to move in a direction perpendicular to an observation optical axis of the optical elements, and
wherein the processor is configured to detect the moving speed of the stage relative to the camera.

8. The microscope system according to claim 1,
wherein the processor is configured to:
   determine, on the basis of the position of the stage relative to the camera, whether or not a ratio of an area of an overlapping portion of the first joined image and the second live image to be captured falls within a prescribed range; and
   in response to determining that the area of the overlapping portion falls within the prescribed range, determine that the position of the stage relative to the camera is within the predetermined range.

9. The microscope system according to claim 1,
wherein the processor is configured to:
   calculate a distance between a position of the stage relative to the camera at which a first live image was captured and a current position of the stage relative to the camera;
   determine whether or not the distance falls within a prescribed range of values; and
   in response to determining that the distance falls within the prescribed range of values, determine that the position of the stage relative to the camera is within the predetermined range.

10. The microscope system according to claim 1,
wherein the processor is configured to:
   in response to determining that the position of the stage relative to the camera is not within the predetermined range, control the output device to perform a second notification different from the first notification.

11. A method for controlling a microscope system comprising:
a microscope comprising:
   a stage on which a sample is mounted;
   a camera configured to be controlled to capture a plurality of live images of the sample mounted on the stage at a prescribed frame rate; and
   an actuator configured to be controlled by a user to move the stage relative to the camera,
wherein the method comprises:
   generating a first joined image of the sample based on a first live image captured by the camera;
   calculating relative positions between the live images consecutively captured by the camera at the prescribed frame rate;
   cumulatively adding the relative positions to obtain a cumulative value;
   detecting a position of the stage relative to the camera from the cumulative value;
   as the user controls the actuator to move the stage relative to the camera, determining, on the basis of the position of the stage relative to the camera, whether the position of the stage relative to the camera is within a predetermined range;

while the position of the stage relative to the camera is determined to be within the predetermined range:
controlling an output device to perform a first notification; and
determining whether a moving speed of the stage relative to the camera is at or below a prescribed threshold; and in response to determining that the moving speed of the stage relative to the camera is at or below the prescribed threshold, joining at least the first joined image and a second live image captured by the camera to generate a second joined image.

12. A computer-readable storage device storing instructions that cause a computer to control a microscope system comprising:
a microscope comprising:
a stage on which a sample is mounted;
a camera configured to be controlled to capture a plurality of live images of the sample mounted on the stage at a prescribed frame rate; and
an actuator configured to be controlled by a user to move the stage relative to the camera,
wherein the instructions cause the computer to at least:
generate a first joined image of the sample based on a first live image captured by the camera;
calculate relative positions between the live images consecutively captured by the camera at the prescribed frame rate;
cumulatively add the relative positions to obtain a cumulative value;
detect a position of the stage relative to the camera from the cumulative value;
as the user controls the actuator to move the stage relative to the camera, determine, on the basis of the position of the stage relative to the camera, whether the position of the stage relative to the camera is within a predetermined range;
while the position of the stage relative to the camera is determined to be within the predetermined range:
control an output device to perform a first notification; and
determine whether a moving speed of the stage relative to the camera is at or below a prescribed threshold; and
in response to determining that the moving speed of the stage relative to the camera is at or below the prescribed threshold, join at least the first joined image and a second live image captured by the camera to generate a second joined image.

* * * * *